US009110514B2

(12) United States Patent
Zhang et al.

(10) Patent No.: US 9,110,514 B2
(45) Date of Patent: Aug. 18, 2015

(54) ELECTRONIC DEVICE WITH SWITCHABLE DISPLAY SCREEN, COMPUTER SYSTEM THEREOF AND METHOD FOR SWITCHING DISPLAY SCREEN

(71) Applicant: Wistron Corporation, New Taipei (TW)

(72) Inventors: Ren-Wei Zhang, New Taipei (TW); Ming-Xing Ji, New Taipei (TW)

(73) Assignee: Wistron Corporation, New Taipei (TW)

( * ) Notice: Subject to any disclaimer, the term of this patent is extended or adjusted under 35 U.S.C. 154(b) by 172 days.

(21) Appl. No.: 13/831,900

(22) Filed: Mar. 15, 2013

(65) Prior Publication Data

US 2014/0043236 A1    Feb. 13, 2014

(30) Foreign Application Priority Data

Aug. 9, 2012    (CN) .......................... 2012 2 0392831

(51) Int. Cl.
*G06F 3/02*    (2006.01)
*G06F 3/14*    (2006.01)
*G09G 5/00*    (2006.01)

(52) U.S. Cl.
CPC ................ *G06F 3/02* (2013.01); *G06F 3/1423* (2013.01); *G09G 5/006* (2013.01); *G09G 2370/12* (2013.01)

(58) Field of Classification Search
USPC ....................................................... 345/168
See application file for complete search history.

(56) References Cited

U.S. PATENT DOCUMENTS

| 2007/0152972 | A1* | 7/2007 | Zhang .......................... 345/168 |
| 2008/0062121 | A1* | 3/2008 | Huang et al. .................. 345/156 |
| 2008/0126629 | A1* | 5/2008 | Huang ............................ 710/64 |
| 2008/0198128 | A1* | 8/2008 | Tsai et al. ..................... 345/156 |
| 2009/0089461 | A1* | 4/2009 | Hsiao et al. ..................... 710/15 |
| 2009/0210591 | A1  | 8/2009 | Tsai |
| 2010/0023660 | A1* | 1/2010 | Liu ................................ 710/71 |
| 2010/0060571 | A1* | 3/2010 | Chen et al. .................... 345/157 |

FOREIGN PATENT DOCUMENTS

TW             201040832         11/2010

* cited by examiner

*Primary Examiner* — Kumar Patel
*Assistant Examiner* — Amy C Onyekaba
(74) *Attorney, Agent, or Firm* — Jianq Chyun IP Office

(57) ABSTRACT

An electronic device with a switchable display screen, a computer system of the electronic device and a method therefor are provided. The electronic device includes a processing unit, a DisplayPort interface, a keyboard control unit, a switch module, and a display panel module. The processing unit generates a first display data according to a DisplayPort standard. When the DisplayPort interface is coupled to an external device, the DisplayPort interface receives an external display data transmitted by the external device. The keyboard control unit generates a switch signal according to a switch event. The switch module selects the first display data or the external display data to be a screen data according to the switch signal. The display panel module coupled to the switch module receives and displays the screen data on a display panel. Thus, the external device may share display content with the display panel of the electronic device.

18 Claims, 2 Drawing Sheets

ELECTRONIC DEVICE WITH SWITCHABLE DISPLAY SCREEN, COMPUTER SYSTEM THEREOF AND METHOD FOR SWITCHING DISPLAY SCREEN

CROSS-REFERENCE TO RELATED APPLICATION

This application claims the priority benefit of China application serial no. 201220392831.4, filed on Aug. 9, 2012. The entirety of the above-mentioned patent application is hereby incorporated by reference herein and made a part of this specification.

BACKGROUND

1. Field

The disclosure relates to a digital display technology (e.g., DisplayPort), and more particularly to an electronic device with a switchable display screen and a computer system of the electronic device.

2. Description of Related Art

The DisplayPort standard is a digital video display interface promoted and developed by Video Electronics Standards Association (VESA). The DisplayPort interface is primarily used to connect a computer device as a video source to a display device (e.g., a computer monitor or a home theater system). Besides, the DisplayPort interface may also be used to transmit audio, USB, and other forms of data, and the data transmission bandwidth of the DisplayPort interface exceeds that of the high-definition multimedia interface (HDMI). Since the DisplayPort interface is characterized by rapid transmission and is royalty-free and verification-free, manufacturers are prone to substitute the DisplayPort interface for existing video transmission interfaces, e.g., HDMI, video graphics array (VGA), and digital visual interface (DVI).

Some of the notebook computers may transmit or share the screen frames of the notebook computers with other external display devices (e.g., computer monitors, projectors, and so on) connected thereto through the interface that complies with the DisplayPort standard. However, the built-in display screens of the existing notebook computers are not able to act as the secondary screens of other external devices through the DisplayPort interface. That is, even though the notebook computer may share its screen frame with other devices, the screen of the notebook computer cannot serve as the screen of any other device.

SUMMARY

The disclosure is directed to an electronic device with a switchable display screen and a computer system of the electronic device. Through a digital display interface (i.e, DisplayPort), the electronic device may receive and display the display data transmitted from an external device, such that the screen of the electronic device may serve as the secondary screen of the external device, and that the external device may share its display content with the electronic device.

In an embodiment of the disclosure, an electronic device that includes a processing unit, a digital display interface, a keyboard control unit, a switch module, and a display panel module is provided. The processing unit generates a first display data according to a digital displaystandard. When the digital displayinterface is coupled to an external device, the digital displayinterface receives an external display data transmitted by the external device. The keyboard control unit generates a switch signal according to a switch event. The switch module is coupled to the processing unit, the digital display interface, and the keyboard control unit. Besides, the switch module selects the first display data or the external display data to be a screen data according to the switch signal. The display panel module is coupled to the switch module to receive and display the screen data on a display panel.

According to an embodiment of the disclosure, the switch module includes a first switch and a second switch. A first connection end of the first switch is coupled to the display panel module, a second connection end of the first switch is coupled to the processing unit to receive the first display data, and a control end of the first switch is coupled to the keyboard control unit to receive the switch signal. A first connection end of the second switch is coupled to the digital display interface, a second connection end of the second switch is coupled to a third connection end of the first switch, a third connection end of the second switch is coupled to the processing unit, and a control end of the second switch is coupled to the keyboard control unit to receive the switch signal. Here, when the switch signal is disabled, the second switch switches on its first and second connection ends to transmit the external display data to the third connection end of the first switch, the first switch switches off its first and second connection ends and switches on its first and third connection ends, so as to effect the external display data as the screen data and transmit the screen data to the display panel module.

According to an embodiment of the disclosure, when the switch signal is enabled, the first switch switches on its first and second connection ends, so as to effect the first display data as the screen data and transmit the screen data to the display panel module, and the second switch switches on its first and third connection ends.

In an embodiment of the disclosure, a computer system that includes an external device and an electronic device is provided. The external device outputs an external display data through a first digital displayinterface. The electronic device includes a processing unit, a second digital displayinterface, a keyboard control unit, a switch module, and a display panel module. The processing unit generates a first display data according to a digital displaystandard. When the second digital display interface is coupled to the external device, the second digital display interface receives the external display data transmitted by the external device. The keyboard control unit generates a switch signal according to a switch event. The switch module is coupled to the processing unit, the second digital display interface, and the keyboard control unit, and the switch module selects the first display data or the external display data to be a screen data according to the switch signal. The display panel module is coupled to the switch module and receives and displays the screen data on a display panel. When the switch signal selects the external display data as the screen data, the external device displays its screen frame on the display panel module of the electronic device.

Other implementation details of the computer system provided herein are described before and thus will not be further explained hereinafter.

In an embodiment of the disclosure, a method for switching a display screen is provided. The method is applied for an electronic device with a digital display interface, a switch module and the display panel module. The method is applied for the following steps. A first display data according to the digital display standard are generated. An external display data transmitted by an external device is received when the digital display interface is coupled to the external device. It is determined that whether a switch signal according to a switch event is received. The first display data or the external display data to be a screen data according to the switch signal is selected by the switch module. And, the screen data on a display panel is received and displayed by the display panel module.

As described in an embodiment of the disclosure and provided above, through the digital display interface (i.e, a DisplayPort interface), the electronic device and the computer system are able to display the display data transmitted by an external device. That is, through the digital displayinterface and the switch module, the electronic device may transmit the display data obtained from the external device to the display panel module of the electronic device and display the display data on its display panel module. The display panel module may serve as the secondary screen of the external device and allow the external device to share the display content with the screen of the electronic device, so as to accomplish the frame input function of the DisplayPort interface.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EXEMPLARY EMBODIMENTS

Figure 1:
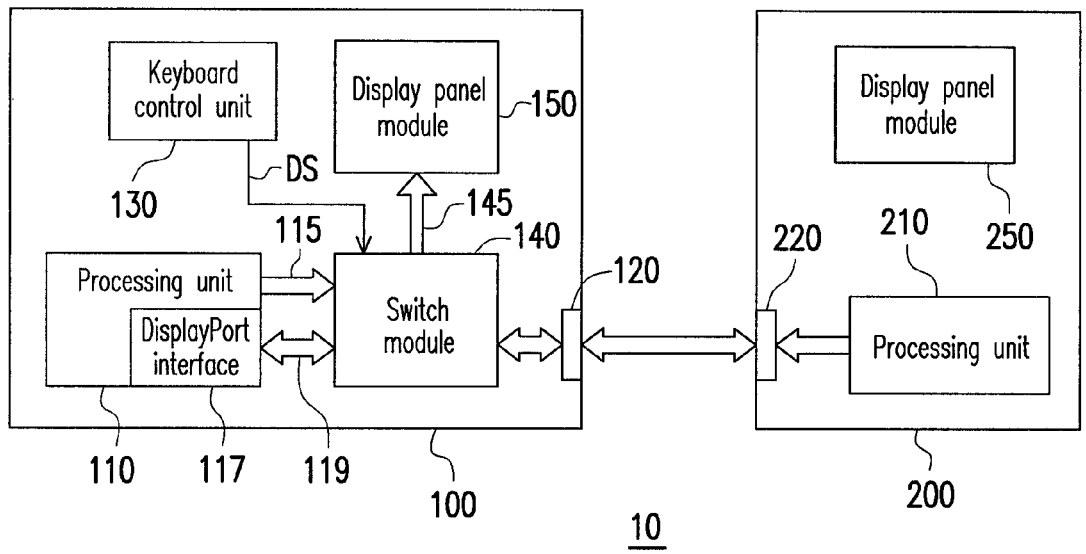
FIG. 1 is a schematic diagram illustrating a computer system according to an embodiment of the disclosure.

FIG. 1 is a schematic diagram illustrating a computer system according to an embodiment of the disclosure. With reference to FIG. 1, the computer system 10 includes an electronic device 100 and an external device 200. The electronic device 100 includes a processing unit 110, a DisplayPort interface 120, a keyboard control unit 130, a switch module 140, and a display panel module 150. In the present embodiment, the electronic device 100 may be a notebook computer, and the display panel module 150 is a liquid crystal display (LCD) fixed to a notebook computer. The DisplayPort interface 120 is one of the digital display interfaces in the embodiment of the disclosure.

The external device 200 further includes another DisplayPort interface 220, another processing unit 210, and another display panel module 250. In the present embodiment, the external device 200 may be another notebook computer (or tablet PC or smart phone) with the DisplayPort interface 220. According to an embodiment of the disclosure, the external device 200 need not be equipped with the display panel module 250 and may merely serve as a source for providing display content. As described below, the processing unit 110 of the electronic device 100 is similar to the processing unit 210 of the external device 200, and the display panel module 150 of the electronic device 100 is also similar to the display panel module 250 of the external device 200. Hence, the descriptions may be cross-referenced to each other.

According to a DisplayPort standard, the processing unit 110 generates a first display data required to be displayed by the electronic device 100 and transmits the first display data to the switch module 140 through a data bus 115. The processing unit 110 may include its own DisplayPort interface 117 and its own data bus 119 coupled to the DisplayPort interface 117, such that the processing unit 110 may communicate with the external device 200 through the switch module 140, which is elaborated hereinafter. In the present embodiment, the processing unit 110 may be a graphics processing unit (GPU), an accelerated processing unit (APU) combining a processor and a graphical kernel, a chip set in the electronic device 110, or any other relevant chip capable of processing display frames. The disclosure is not limited thereto.

The DisplayPort interface 120 is a digital video interface promoted and developed by Video Electronics Standards Association (VESA) according to the DisplayPort standard. When the DisplayPort interface 220 of the external device 200 is coupled to the DisplayPort interface 120 of the electronic device 100 by a user, the processing unit 210 of the external device 200 may attempt to transmit the external display data generated by the external device 200 to the DisplayPort interface 120, such that the DisplayPort interface 120 receives the external display data transmitted by the external device 200.

The keyboard control unit 130 is coupled to the switch module 140 and generates a switch signal DS according to a switch event. The switch event may be adjusted based on actual requirements. For instance, the switch event described herein may refer to the following: when a user presses a corresponding hotkey on a keyboard, the electronic device 100 reverses the phase of the switch signal DS, such that the enabled switch signal DS is disabled, or that the disabled switch signal DS is enabled. In another embodiment, the switch event may be controlled by the operation system of the electronic device 100. Through the detection mechanism of the DisplayPort interface 120, it is determined whether to remind a user of disabling the switch signal DS, and thereby the display frames on the external device 200 may be shared and displayed on the display panel of the electronic device 100. In the present embodiment, the switch signal DS is preset to be in an enabling state during initialization of the electronic device 100, such that the display panel module 150 may well display the display frames transmitted by the processing unit 110 when the electronic device 100 is activated.

The switch module 140 is coupled to the processing unit 110, the DisplayPort interface 120, and the keyboard control unit 130. According to the switch signal DS, the switch module 140 selects the first display data or the external display data (transmitted by the external device 200) to be a screen data, and the screen data is transmitted to the display panel module 150 through the data bus 145. For instance, when the electronic device 100 is used in a normal manner and displays its own display frames, e.g., when the switch signal DS is enabled, the switch module 140 selects the first display data of the processing unit 110 of the electronic device 100 as the screen data, and the screen data is displayed on the display panel module 150. Here, the processing unit 110 of the electronic device 100 and the processing unit 210 of the external device 200 are communicated with each other under the DisplayPort standard, so as to transmit data therebetween or achieve other functions.

When the switch signal DS selects the external display data to be the screen data of the electronic device 100, e.g., when the enabling switch signal DS is disabled, the switch module 140 transmits the external display data (received from the external device 200) to the display panel module 150, and the external device 200 is allowed to transmit its screen frames to the display panel module 150 of the electronic device 100, such that the screen frames of the external device 200 may be shared with or displayed on the display panel of the electronic device 100. At this time, the frame originally displayed on the electronic device 100, e.g., the first display data, will no longer be displayed.

The display panel module 150 is coupled to the switch module 140 and receives and displays the screen data of the data bus 145 on the display panel of the electronic device 100. Here, the display panel module 150 may be an LCD timing controller or an application chip that receives the display data under the DisplayPort standard for controlling the display panel.

Figure 2:
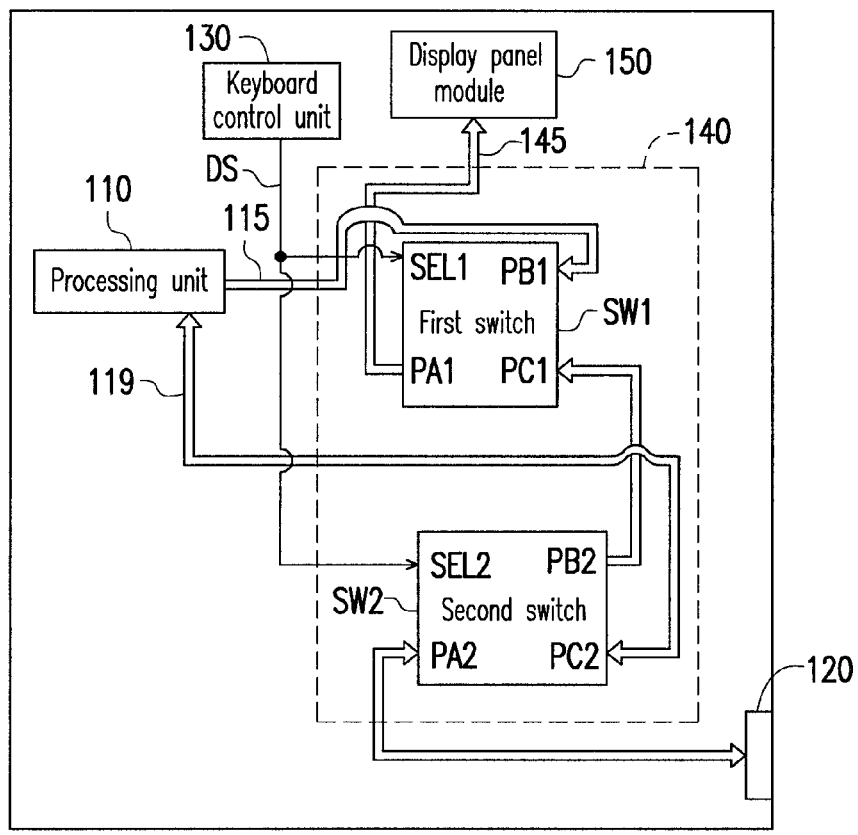
FIG. 2 is a functional block diagram illustrating an electronic device according to an embodiment of the disclosure.

In the present embodiment, the switch module 140 may be implemented in form of two switches SW1 and SW2 shown in FIG. 2. Specifically, FIG. 2 is a functional block diagram illustrating the electronic device 100 according to an embodiment of the disclosure. The switch module 140 shown in FIG. 2 includes a first switch SW1 and a second switch SW2. In the present embodiment, the first switch SW1 and the second switch SW2 are both three-way switches, and each of the first switch SW1 and the second switch SW2 has three connection ends and one control end.

The first connection end PA1 of the first switch SW1 is coupled to the display panel module 150, a second connection end PB1 of the first switch SW1 is coupled to the processing unit 110 to receive the first display data, and a control end SEL1 of the first switch SW1 is coupled to the keyboard control unit 130 to receive the switch signal DS. A first connection end PA2 of the second switch SW2 is coupled to the DisplayPort interface 120, a second connection end PB2 of the second switch SW2 is coupled to a third connection end PC1 of the first switch SW1, and a third connection end PC2 of the second switch SW2 is coupled to the processing unit 110. A control end SEL2 of the second switch SW2 is coupled to the keyboard control unit 130 to receive the switch signal DS.

Based on the above-mentioned hardware structure, when the switch signal DS is enabled, the first switch SW1 switches on its first and second connection ends PA1 and PB1, so as to effect the first display data of the data bus 115 as the screen data and transmit the screen data to the display panel module 150 through the data bus 145. In addition, the second switch SW2 switches on its first and third connection ends PA2 and PC2, such that the processing unit 210 of the external device 200 may communicate with and exchange data with the processing unit 110 of the electronic device 100 according to the DisplayPort standard.

In another aspect, when the switch signal DS is disabled, the second switch SW2 switches off its first and third connection ends PA2 and PC2 and switches on its first and second connection ends PA2 and PB2, so as to transmit the external display data of the external device 200 to the third connection end PC1 of the first switch SW1. Simultaneously, the first switch SW1 switches off its first and second connection ends PA1 and PB1 and switches on its first and third connection ends PA1 and PC1 to effect the external display data as the screen data and transmit the screen data to the display panel module 150 through the data bus 145.

According to the present embodiment, after an additional switch module together with the corresponding mechanism is added to the hardware circuit of the electronic device 100 shown in FIG. 1, the notebook computer 100 with the DisplayPort interface may act as the secondary screen of the external device 200. Thereby, the display content of the external device 200 to be watched or read may be shared with others, and the function of sharing conference materials or the like may then be achieved.

Moreover, as long as the external device 200 has the DisplayPort interface and the frame output function, the external device 200 may use the screen of the electronic device 100 as a sharing or displaying target in no need of additionally installing other software or changing the hardware structure, e.g., in no need of additionally configuring a signal detection module or an image processing chip with certain functions. The DisplayPort interface itself is capable of data transmission. Hence, according to the present embodiment, when the switch signal is enabled, the electronic device 100 may communicate with and exchange data with the external device 200 through the switch module 140 under the DisplayPort standard, so as to equip the electronic device 100 with extra functions. From another perspective, the transmission bandwidth of the DisplayPort interface is greater than that of any other conventional video transmission interface. Accordingly, based on the frame input function of the DisplayPort interface, the video clips or video data with high definition or ultra-high definition may be transmitted instantly, and the viewing experience may be further enhanced.

Figure 3:
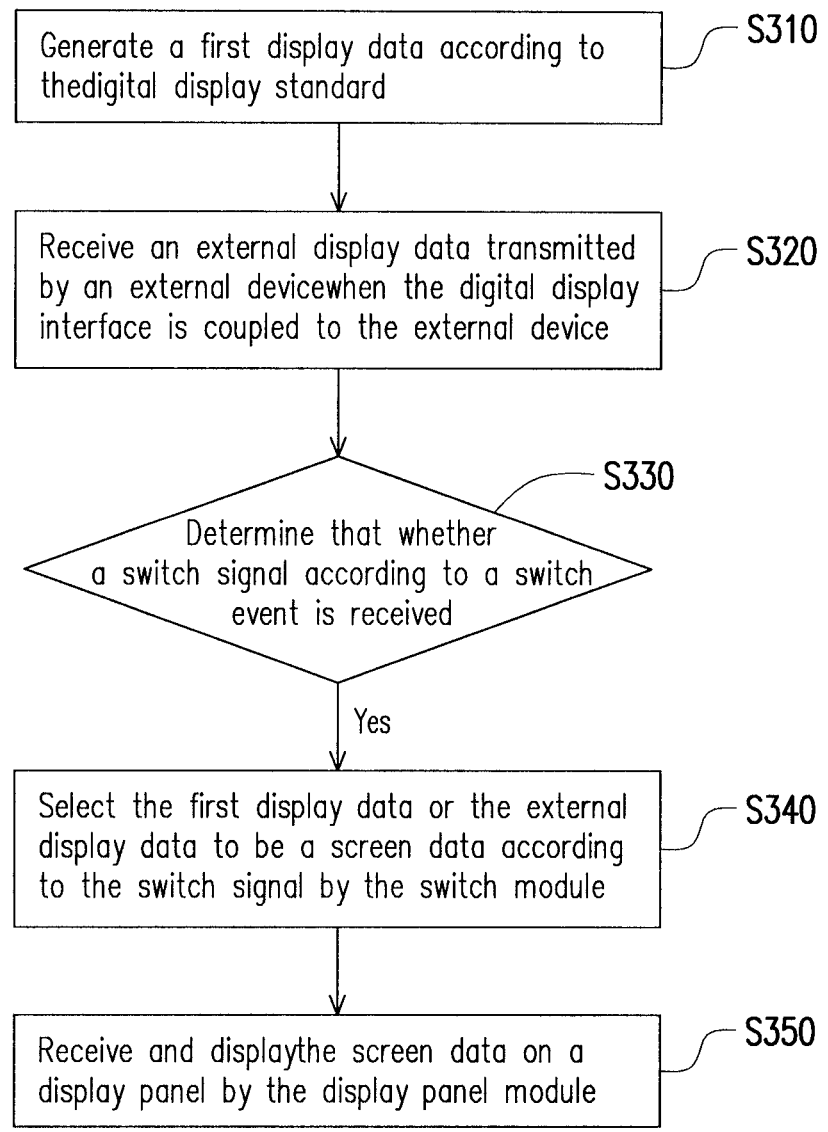
FIG. 3 is a flow chart illustrating a method for switching a display screen to an embodiment of the disclosure.

FIG. 3 is a flow chart illustrating a method for switching a display screen to an embodiment of the disclosure. With reference to FIGS. 1-3, the method for switching the display screen is applied for the electronic device 100 with the digital display interface (e.g., the DisplayPort interface 120), the switch module 140 and the display panel module 150. In step 310, the electronic device 100 generates a first display data according to the digital display standard (e.g., DisplayPort standard). In step S320, when the DisplayPort interface 120 is coupled to the external device 200, the electronic device 100 receives an external display data transmitted by the external device 200. In step S330, the electronic device 100 determines that whether a switch signal DS according to a switch event is received. When the step 330 is yes, the switch module 140 selects the first display data or the external display data to be a screen data according to the received switch signal DS. And, in step S350, the display panel module 150 receives and displays the screen data on a display panel. Other implementation details of the method provided herein are described before and thus will not be further explained hereinafter.

To sum up, through the DisplayPort interface, the electronic device and the computer system described in an embodiment of the disclosure are able to display the display data transmitted by an external device. That is, through the DisplayPort interface and the switch module, the electronic device may transmit the display data obtained from the external device to the display panel module of the electronic device and display the display data on its display panel module. The display panel module may serve as the secondary screen of the external device and allow the external device to share the display content with the screen of the electronic device, so as to accomplish the frame input function of the DisplayPort interface.

Although the disclosure has been described with reference to the embodiments thereof, it will be apparent to one of the ordinary skills in the art that modifications to the described embodiments may be made without departing from the spirit of the disclosure. Accordingly, the scope of the disclosure will be defined by the attached claims not by the above detailed description.

What is claimed is:
1. An electronic device comprising:
a processing unit generating a first display data according to a digital display standard;
a digital display interface, wherein when the digital display interface is coupled to an external device, the digital display interface receives an external display data transmitted by the external device;
a keyboard control unit generating a switch signal according to a switch event;
a switch module coupled to the processing unit, the digital display interface, and the keyboard control unit, the switch module selecting the first display data or the external display data to be a screen data according to the switch signal,
wherein the switch module comprises:
a first switch, wherein a first connection end of the first switch is coupled to the display panel module, a second connection end of the first switch is coupled to the processing unit to receive the first display data, and a control end of the first switch is coupled to the keyboard control unit to receive the switch signal; and
a second switch, wherein a first connection end of the second switch is coupled to the digital display interface, a second connection end of the second switch is coupled to a third connection end of the first switch, a third connection end of the second switch is coupled to the processing unit, and a control end of the second switch is coupled to the keyboard control unit to receive the switch signal,
wherein when the switch signal is disabled, the second switch switches on the first and second connection ends of the second switch to transmit the external display data to the third connection end of the first switch, the first switch switches off the first and second connection ends of the first switch and switches on the first and third connection ends of the first switch to effect the external display data as the screen data and transmit the screen data to the display panel module; and
a display panel module coupled to the switch module, the display panel module receiving and displaying the screen data on a display panel.

2. The electronic device as recited in claim 1, wherein when the switch signal is enabled, the first switch switches on the first and second connection ends of the first switch to effect the first display data as the screen data and transmit the screen data to the display panel module, and the second switch switches on the first and third connection ends of the second switch.

3. The electronic device as recited in claim 1, wherein first switch and the second switch are both three-way switches.

4. The electronic device as recited in claim 1, wherein the switch signal is preset to be in an enabling state during initialization.

5. The electronic device as recited in claim 1, wherein the switch event is a determination of whether a hotkey is pressed or whether an operation system of the electronic device disables the switch signal.

6. The electronic device as recited in claim 1, wherein the electronic device is a notebook computer, and the display panel module is a liquid crystal display fixed to the notebook computer.

7. The electronic device as recited in claim 1, wherein the digital display standard is a DisplayPort standard.

8. The electronic device as recited in claim 1, wherein the digital display interface is a DisplayPort interface.

9. A computer system comprising:
an external device outputting an external display data through a first DisplayPort interface; and
an electronic device comprising:
a processing unit generating a first display data according to a DisplayPort standard;
a second DisplayPort interface, wherein when the second DisplayPort interface is coupled to the external device, the second DisplayPort interface receives the external display data transmitted by the external device;
a keyboard control unit generating a switch signal according to a switch event;
a switch module coupled to the processing unit, the second DisplayPort interface, and the keyboard control unit, the switch module selecting the first display data or the external display data to be a screen data according to the switch signal; and
a display panel module coupled to the switch module, the display panel module receiving and displaying the screen data on a display panel,
wherein the switch module comprises:
a first switch, and wherein a first connection end of the first switch is coupled to the display panel module, a second connection end of the first switch is coupled to the processing unit to receive the first display data, and a control end of the first switch is coupled to the keyboard control unit to receive the switch signal; and
a second switch, wherein a first connection end of the second switch is coupled to the second DisplayPort interface, a second connection end of the second switch is coupled to a third connection end of the first switch, a third connection end of the second switch is coupled to the processing unit, and a control end of the second switch is coupled to the keyboard control unit to receive the switch signal,
wherein when the switch signal is disabled, the second switch switches on the first and second connection ends of the second switch to transmit the external display data to the third connection end of the first switch, the first switch switches off the first and second connection ends of the first switch and switches on the first and third connection ends of the first switch to effect the external display data as the screen data and transmit the screen data to the display panel module, and
wherein when the switch signal selects the external display data as the screen data, the external device displays a screen frame of the external device on the display panel module of the electronic device.

10. The computer system as recited in claim 9, wherein when the switch signal is enabled, the first switch switches on the first and second connection ends of the first switch to effect the first display data as the screen data and transmit the screen data to the display panel module, and the second switch switches on the first and third connection ends of the second switch.

11. A method for switching a display screen, applied for an electronic device with a digital display interface, a switch module and a display panel module, the method comprising:
generating a first display data according to the digital display standard;
receiving an external display data transmitted by an external device when the digital display interface is coupled to the external device;
determining whether a switch signal according to a switch event is received;
selecting the first display data or the external display data to be a screen data according to the received switch signal by the switch module; and
receiving and displaying the screen data on a display panel by the display panel module, wherein the switch module comprises:
- a first switch, wherein a first connection end of the first switch is coupled to the display panel module, a second connection end of the first switch is coupled to the processing unit to receive the first display data, and a control end of the first switch is coupled to the keyboard control unit to receive the switch signal; and
- a second switch, wherein a first connection end of the second switch is coupled to the digital display interface, a second connection end of the second switch is coupled to a third connection end of the first switch, a third connection end of the second switch is coupled to the processing unit, and a control end of the second switch is coupled to the keyboard control unit to receive the switch signal,
- wherein when the switch signal is disabled, the second switch switches on the first and second connection ends of the second switch to transmit the external display data to the third connection end of the first switch, the first switch switches off the first and second connection ends of the first switch and switches on the first and third connection ends of the first switch to effect the external display data as the screen data and transmit the screen data to the display panel module.

12. The method as recited in claim 11, wherein when the switch signal is enabled, the first switch switches on the first and second connection ends of the first switch to effect the first display data as the screen data and transmit the screen data to the display panel module, and the second switch switches on the first and third connection ends of the second switch.

13. The method as recited in claim 11, wherein the first switch and the second switch are both three-way switches.

14. The method as recited in claim 11, wherein the switch signal is preset to be in an enabling state during initialization.

15. The method as recited in claim 11, wherein the switch event is a determination of whether a hotkey is pressed or whether an operation system of the electronic device disables the switch signal.

16. The method as recited in claim 11, wherein the electronic device is a notebook computer, and the display panel module is a liquid crystal display fixed to the notebook computer.

17. The electronic device as recited in claim 11, wherein the digital display standard is a DisplayPort standard.

18. The electronic device as recited in claim 11, wherein the digital display interface is a DisplayPort interface.

* * * * *